United States Patent

[11] 3,600,889

| [72] | Inventor | Richard J. Ifield<br>Beecroft, New South Wales, Australia |
|---|---|---|
| [21] | Appl. No. | 833,921 |
| [22] | Filed | June 17, 1969 |
| [45] | Patented | Aug. 24, 1971 |
| [73] | Assignee | Joseph Lucas (Industries) Limited<br>Birmingham, England |
| [32] | Priority | June 24, 1968 |
| [33] | | Great Britain |
| [31] | | 29,924/68 |

[54] FUEL CONTROL SYSTEM FOR GAS TURBINE ENGINES
9 Claims, 2 Drawing Figs.

| [52] | U.S. Cl. | 60/39.28 |
| [51] | Int. Cl. | F02c 9/10 |
| [50] | Field of Search | 60/39.28 |

[56] References Cited
UNITED STATES PATENTS

| 2,851,855 | 9/1958 | Gamble | 60/39.28 |
| 2,982,096 | 5/1961 | Bevers et al. | 60/39.28 |
| 3,002,348 | 10/1961 | Haase | 60/39.28 |
| 3,018,621 | 1/1962 | Arnett et al. | 60/39.28 |
| 3,123,128 | 3/1964 | Zeisloft | 60/39.28 X |
| 3,168,102 | 2/1965 | Tyler et al. | 60/39.28 |
| 3,438,199 | 4/1969 | McGinnis et al. | 60/39.28 |

FOREIGN PATENTS

| 677,138 | 8/1952 | Great Britain | 60/39.28 |

*Primary Examiner*—Al Lawrence Smith
*Attorney*—Holman & Stern

ABSTRACT: A system for controlling the fuel supply to a gas turbine engine includes a valve between the fuel pump and the burners of the engine and arranged to spill fuel delivered by the pump. Fuel flows to the burners via a venturi and the spill valve is urged in a direction to spill fuel by the pressure upstream of the venturi and in the other direction by a spring-assisted piston subjected to the pressure at the venturi throat. Cooperating with the spring-assisted piston is a lever actuated by a diaphragm forming one wall of a chamber which is subjected to an air pressure signal derived from the output of the engine compressor and modified by a blade movable in a kinetic orifice. The blade is movable by a governor mechanism and a linkage coupled to the engine throttle control, so that the blade is moved to reduce the pressure in the chamber when the desired engine speed is greater than the actual speed, and thereby move the lever so that the spill valve may operate to increase spillage of fuel. The valve is similarly operated to reduce spillage when the desired speed is greater than the actual speed. An opposite wall of the chamber is formed by a smaller diaphragm biased towards the first diaphragm by a spring. Stops on the respective diaphragms maintain them in spaced relationship. These stops separate at a predetermined pressure to ensure that a sufficient margin for acceleration exists at all engine speeds.

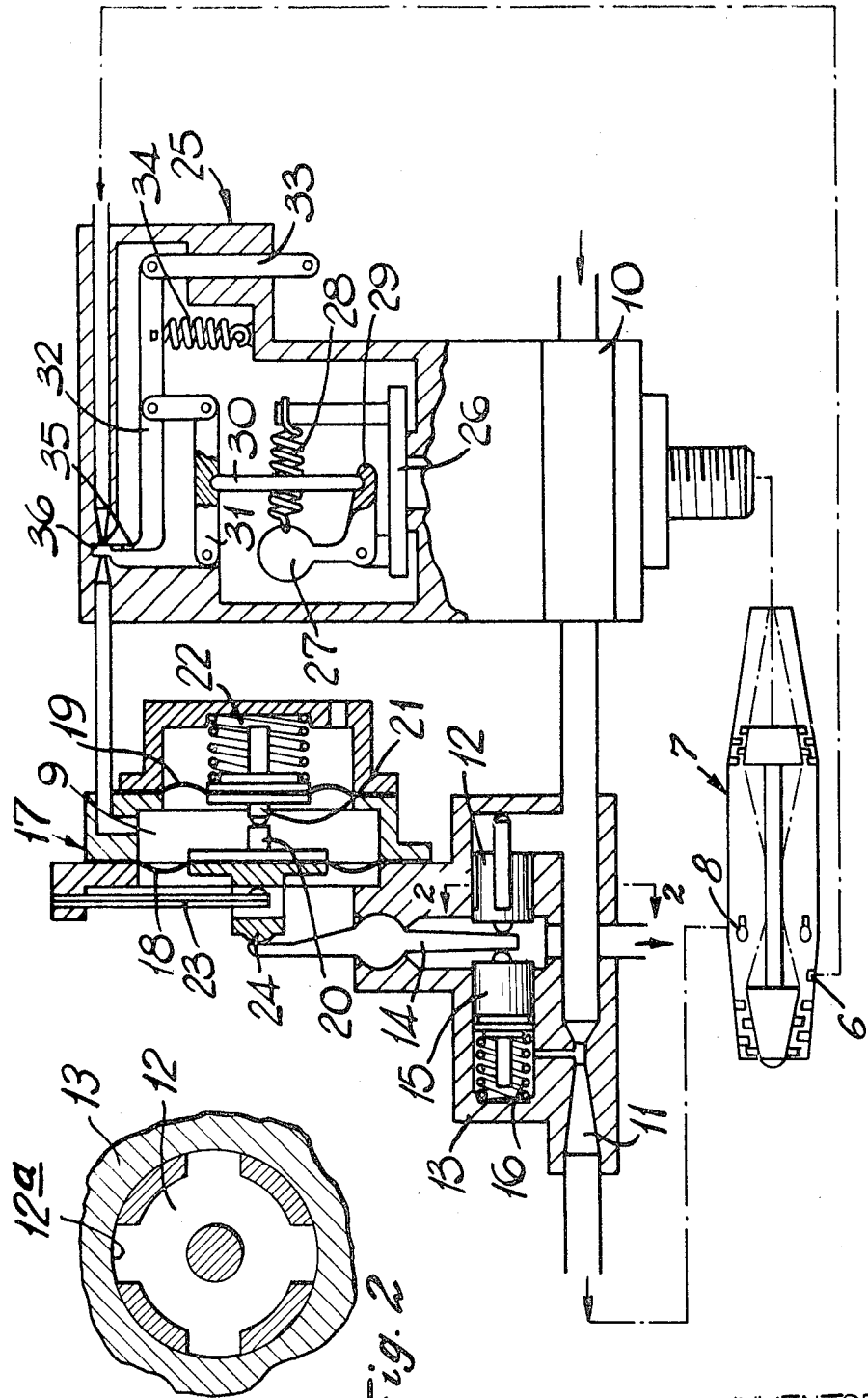

FUEL CONTROL SYSTEM FOR GAS TURBINE ENGINES

This invention relates to a fuel control system of a gas turbine engine and has as an object to provide such a system in a convenient form.

A fuel control system in accordance with the invention comprises a venturi through which fuel is caused to flow to the burners of the engine, a fuel pressure control device sensitive to the fuel pressure upstream of the venturi and at the throat of the venturi for varying the fuel pressure upstream of the venturi, loading means sensitive to an air pressure signal derived from the compressor of the engine with which the system is to be used for varying the loading applied to said fuel pressure control device and a governor mechanism driven, in use, at a speed proportional to the engine speed for modifying the air pressure signal applied to said loading device in accordance with the relationship between the desired and actual running speeds of the engine.

An example of the invention is shown diagrammatically in the accompanying drawing in which FIG. 1 is a diagrammatic view of the whole fuel system and FIG. 2 is a fragmentary section on line 2—2 in FIG. 1.

In the specific example shown a fixed displacement pump, such as a gear pump 10 driven by the engine 7, is employed for delivering fuel at pressure to the burners 8 of the engine 7. Fuel control is effected by spilling a proportion of the fuel supplied by the pump 10. It is to be appreciated, however, that the invention may also be applied to systems incorporating a servo-operated variable displacement pump or a centrifugal type pump with a variable throttle.

Fuel is delivered from the pump 10 to the burners 9 of the engine 8 via a venturi 11 and spill from the upstream side of the venturi 11 is controlled by a slotted valve member 12 slidable in a passage 12a in a fuel pressure control device 13. The valve 12 is acted upon by fuel at the pressure upstream of the venturi 11, which pressure urges it into engagement with one end of a pivoted lever 14 to tend to turn the lever 14 in a clockwise direction as seen in the drawing. Acting upon the same end of the lever 14 is a piston 15 slidable in the same passage in the device 13 as the valve member 12. This piston 15 is urged into contact with the lever 14 by fuel at the pressure existing at the throat of the venturi 11 and is assisted by a spring 16. The piston 15 tends to turn the lever 14 in an anticlockwise direction urging the valve member 12 to a minimum spill position.

A variable loading is applied to the opposite end of the lever 14 by means of a loading device 17. This device 17 incorporates a pair of diaphragms 18, 19, of which the diaphragm 18 is of larger area, these diaphragms defining between them a chamber 9 to which an air pressure signal derived from a tapping 6 in the compressor output is supplied in use. The two diaphragms have interengaging stops 20, 21 respectively, diaphragm 19 being urged by a spring 22 and diaphragm 18 by a bimetallic spring 23 so that the stops 20, 21 engage one another. The bimetallic spring 23 is sensitive to the ambient temperature so that the force it applies to the diaphragm 18 varies with ambient temperature. The diaphragm 18 has an abutment 24 engaged with the end of the lever 14 and the arrangement is such that increasing air pressure in the chamber 9 causes the diaphragm 18 to move to the left as viewed in the drawings so that the lever 14 tends to turn in an anticlockwise direction. It will be appreciated that when the pressure applied to the chamber 9 is below a predetermined valve, dependent upon the ambient temperature the two diaphragms 18, 19 will move as a single unit. When the pressure rises above this predetermined value, however, diaphragm 19 will move away from diaphragm 18 so that the loading of spring 22 is no longer felt by diaphragm 18.

The pressure signal which is applied to the chamber 9 is modified by a governor mechanism 25 which is substantially the same as that described in my copending application Ser. No. 833,918 of even date. This mechanism includes a rotating part 26 which is driven, in use, at a speed proportional to the engine speed. This part 26 carries one or more pivoted weights 27 which move outwardly against a loading applied thereto by a spring 28 as the speed of rotation of the part 26 increases. An arm 29 connected to the weight 27 serves to displace an axially disposed rod 30 which engages a movement magnifying lever 31 pivoted to the housing of the governor mechanism 25. The lever 31 is linked to a second movement magnifying lever 32 which is pivotally connected at one end to a throttle link 33 displaceable in a direction parallel to the axis of rotation of the part 26. A spring 34 acts on the lever 32 to tend to turn this about the axis of its connection to the lever 31 in a clockwise direction or about the axis of its connection to the link 33 in an anticlockwise direction. The end of the lever 32 has a blade 35 which controls a kinetic orifice 36 in the air line supplying air from the engine compressor to the chamber 9.

During normal steady running the blade 35 will partially interrupt the flow of air through the kinetic nozzle 36 so that the pressure in the chamber 9 will be intermediate the compressor output pressure and the prevailing atmospheric pressure. The loading applied to the fuel pressure control device by the lever 14 will then be such that the valve member 12 occupies a position to permit sufficient spill flow to maintain the pressure drop between the upstream side of the venturi and the throat thereof at a value such that the flow of fuel to the engine is sufficient to keep the engine running at the desired speed. Should the engine speed be in excess of the desired speed the governor mechanism will cause the blade 35 to occupy a position such that the pressure in chamber 9 is reduced so that the loading applied to the device 13 by the lever 14 is reduced and valve member 12 moves to the left as viewed in the drawing to increase the spill and decrease the flow to the engine. When the engine speed is below the required speed the blade 35 will be withdrawn slightly from the kinetic orifice 36 so that the pressure in chamber 9 increases and increases the loading on the lever 14 to decrease spillage of fuel.

During acceleration the blade 35 will be moved completely clear of the kinetic orifice 36 so that substantially the full compressor delivery pressure is applied to chamber 9.

The arrangement of the double diaphragm which separates at a predetermined pressure ensures that a sufficient acceleration margin is available at all engine speeds.

Having thus described my invention what I claim as new and desire to secure by Letters Patent is:

1. A fuel control system for a gas turbine engine having a compressor, comprising a fuel pump, a venturi connected between the fuel pump and the engine, fuel flowing from the pump to the engine passing through said venturi, a fuel pressure control device sensitive to the fuel pressures upstream of said venturi and at the throat of said venturi for varying the fuel pressure upstream of the venturi, loading means providing a bias for said fuel pressure control device against which the difference between said fuel pressures is balanced, said loading device being responsive to an air pressure signal applied thereto from the engine compressor, a governor mechanism driven by the engine at a speed proportional to the engine speed for modifying the air pressure signal applied to said loading device in accordance with the relationship between the desired and actual running speeds of the engine and causing the engine speed to approach the desired speed and a temperature sensitive resilient device acting on said loading means to further modify the bias applied thereby to the fuel pressure control device in accordance with ambient temperature.

2. A system as claimed in claim 1 in which the fuel pressure control device comprises a spill valve upstream of the venturi.

3. A system as claimed in claim 2 in which the spill valve is actuated in a direction to increase spillage by the said pressure upstream of the venturi and in a direction to decrease spillage by the said loading means and by the said pressure at the throat of the venturi.

4. A system as claimed in claim 1 in which the temperature sensitive device comprises a bimetallic spring.

5. A system as claimed in claim 1 in which the loading means includes a pair of diaphragms which define between them a volume to which, in use, the said air pressure signal is applied.

6. A system as claimed in claim 5 in which one of the said diaphragms has an area greater than that of the other.

7. A system as claimed in claim 6 in which said one diaphragm is coupled to the fuel pressure control device and said other diaphragm is urged towards said one diaphragm by biasing means and a further comprising a pair of abutments carried respectively by said diaphragms and interengaged when the air pressure signal has a value less than a predetermined value, whereby the spring force is applied through said abutments to the fuel pressure device, said abutments separating when the air pressure signal has a value above said predetermined value.

8. A system as claimed in claim 1 in which said governor comprises a kinetic nozzle controlled by a movable blade movable by means responsive to the relationship between the desired and actual engine speeds.

9. A system as claimed in claim 8 in which the said responsive means comprises a lever coacting both with a speed responsive mechanism driven at a speed proportional to the engine and with a linkage to the engine throttle control.